United States Patent [19]

Foucard

[11] 4,335,463
[45] Jun. 15, 1982

[54] SIMULTANEOUS INTEGRAL MULTI-ACCESS TRANSMISSION SYSTEM ON TRANSMISSION LINES BY OPTICAL FIBRES

[75] Inventor: Joseph Foucard, Valence, France

[73] Assignee: Crouzet, Paris, France

[21] Appl. No.: 194,906

[22] Filed: Oct. 7, 1980

[30] Foreign Application Priority Data

Oct. 15, 1979 [FR] France .................................. 79 25741

[51] Int. Cl.³ .............................................. H04K 1/04
[52] U.S. Cl. ....................................... 375/1; 455/608; 455/612
[58] Field of Search .................... 375/1; 455/600, 601, 455/605, 611, 608, 612; 370/107

[56] References Cited

U.S. PATENT DOCUMENTS 3,828,185  8/1974  Vandling .......................... 455/605
4,107,518  8/1978  McMahon ........................ 455/601

*Primary Examiner*—Benedict V. Safourek
*Assistant Examiner*—Stephen Chin
*Attorney, Agent, or Firm*—Holman & Stern

[57] ABSTRACT

Spectrum spread transmission system, particularly for telephone network, employing optical fibres.

It comprises, for the emission part, a pseudo-random sequence generator, a multiplier, a transducer for transducing electrical signals into light and, for the reception part, a transducer transducing light into electrical signals, a pseudo-random sequence generator and a threshold detector. Synchronized emission clock and reception clock are provided.

1 Claim, 6 Drawing Figures

SIMULTANEOUS INTEGRAL MULTI-ACCESS TRANSMISSION SYSTEM ON TRANSMISSION LINES BY OPTICAL FIBRES

BACKGROUND OF THE INVENTION

The present invention relates to transmission systems employing optical fibres.

Presently known systems are of two types: real time systems, in which either the available pass band is divided into channels of sufficient width to allow the transmission of the useful band, or lights of different colours are used at emission and filters at reception; shared time systems, in which each channel is coded then transmitted sequentially on the line, the transmission cadence being much higher than the highest frequency of the useful band to be transmitted. Combinations of the two types are possible.

Real time systems are affected by the non-linearities, at all levels, of the transmission channel, which provoke parasitic beats. Shared time systems raise serious problems of synchronisation and decommutation.

The present invention relates to a system in which the spectrum of the information to be transmitted is spread out over the whole of the available pass band at emission. To this end, a random signal is modulated by the information to be transmitted.

At reception, the signal received is intercorrelated with a copy of the random signal used at emission, recreated locally. In fact, "pseudo-random" codes are used. This system is known as "spectrum spread" system.

Advantages thereof are numerous:

Emission and reception may be simultaneous on the same transmission channel;

The non-linearities do not affect the results a great deal;

The problems of format synchronisation do not exist.

Furthermore, in the transmission of light pulses by optical fibres, the information to be transmitted modulates the light intensity of a source (electroluminescent diode, laser). The modulated light is injected into one or more fibres which guide it with a slight attenuation until it is used, when it is converted, again, into electrical energy by a detector (PIN photodiode or cascade photodiode).

The advantages are numerous and important: electrical insulation, no radio-frequency radiation, very little attenuation (presently 2 db/km), and very large pass band (presently 2 GHz).

SUMMARY OF THE INVENTION

The purpose of the device according to the invention is to improve the transmission characteristics, by combining the technique of spectrum spread with transmission by optical fibres.

To this end, the present invention relates to a system of transmission employing optical fibres, characterized in that it comprises emitter means spreading the spectrum of the information to be transmitted over all the available pass band at emission, means for transducing electrical signals into light and light into electrical signals and receiver means for identifying an emitter and restoring the message thereof.

The advantage of such an association is obvious when it is known that the spectrum spread process gain (PG) may be determined by the ratio between the pass band of the signal to be transmitted (BS) and the pass band of the pseudo-random code (BN), according to the relation:

$$PG = BN/BS.$$

The process gain PG expresses to some extent the intrinsic signal-to-noise ratio of the system.

For example, if $BN = 10$ MHz and $BS = 5000$ Hz, then $PG = 10^7/5 \cdot 10^3 = 0.2, 10^4 = 2000$ In practice, this means:

that a jamming signal is rejected in the ratio 1 to 2000;

that two subscribers simultaneously using the line disturb each other mutually only in a ratio of 1 to 2000.

The example chosen is not limiting and a link having the following characteristics may be imagined, particularly in the case of the telephone:

$BS = 2500$ Hz (telephone band from 50 Hz to 2500 Hz)

$BN = 1$ GHz (fibre with index gradient)

$PG = 10^9/2.5 \times 10^3 = 400\,000$

This means that 400,000 subscribers could communicate simultaneously on the same line, on condition that they can exploit a signal-to-noise ratio equal to 1.

The association of optical fibres and spectrum spread presents further interest. It should firstly be noted that the reflections in the transmission line are treated as noises, insofar as their delay enables the correlator to reject them. Furthermore, the pass band of the optical fibres is itself limited by two phenomena:

the dispersion of the material, which is due to the variation in the speed of propagation of the light as a function of the wave length;

the dispersion of modes, the modes of high orders propagating more slowly than the modes of low orders.

Consequently, insofar as these phenomena are not correlated with the pseudo-random codes used by the subscribers, these dispersions will be rejected in the ratio of the process gain. This should enable the pass band to be widened proportionally.

BRIEF DESCRIPTION OF THE DRAWINGS

The invention will be more readily understood on reading the following description with reference to the accompanying drawings, in which.

DESCRIPTION OF PREFERRED EMBODIMENTS OF THE INVENTION

Figure 1:
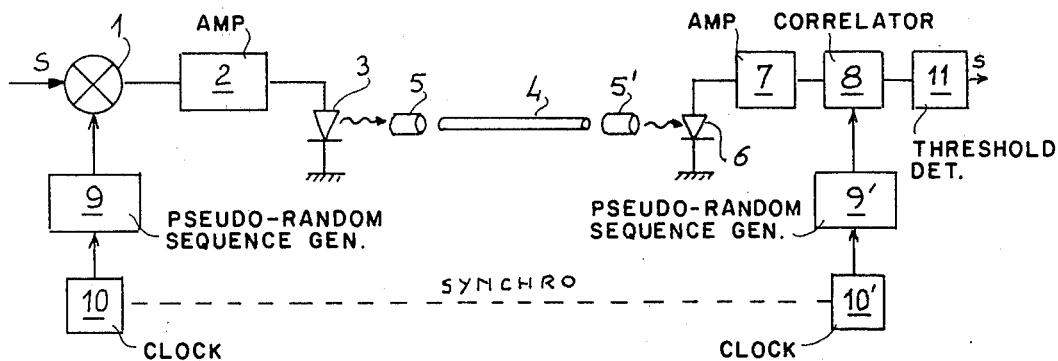
FIG. 1 shows a unidirectional link with spectrum spread, which enables information to be transmitted from one point to another, in a highly disturbed atmosphere, in one direction (sensor sending information to a processing member).

In a unidirectional link with spectrum spread by optical fibres, as shown in FIG. 1, a maximum cadence of the signal to be transmitted of 10K bits (BS) and 30 M bits (BN) may be allowed for the maximum output of the pseudorandom generator allowed by the optical link.

The process gain is then:

$$PG = BN/BS = 30 \cdot 10^6 / 10^4 = 3000$$

The emission part comprises a logic multiplier 1 (exclusive OR gate for example) on the inputs of which are applied the signal S to be transmitted, previously numerised in series form, and the signal issuing from a pseudorandom sequence generator 9, also in series form at a cadence of 10 M bits. The resultant signal is amplified by an amplifier 2, then applied to a fast electroluminescent diode 3 (DEL) or to a gallium arsenide laser for example.

The transmission line comprises at least one low-loss optical fibre 4. At one end, an optical coupler 5 connects it to the emitter and, at the other end, a coupler 5' of the same type connects it to a receiver.

The reception part comprises a "PIN" photodiode 6, which effects the conversion of the light pulses received into electrical pulses.

A low-noise amplifier 7 takes the signal to a level compatible with the one required by the following processing stages.

The essential device is a correlator 8 at the inputs of which are applied the signal issuing from the input stages of the receiver and the signal elaborated by a pseudorandom sequence generator 9' identical to that, 9, of the emitter, and of which the clock 10' is synchronised with that, 10, of the emission sequence generator 9.

At the output of the correlator 8, a threshold detector 11 restores the shape of the signal S applied to the input of the emitter.

Figure 2:
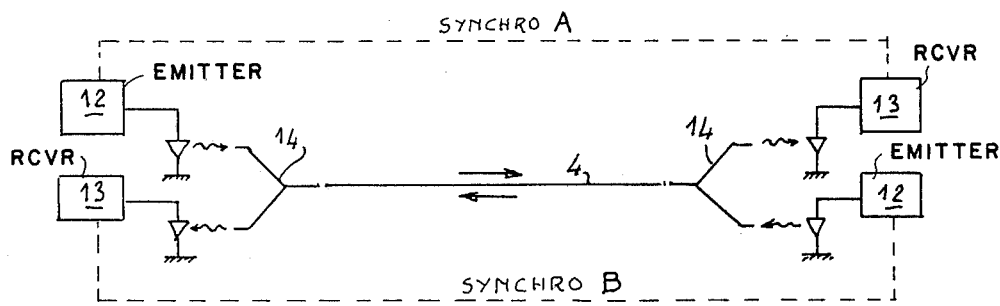
FIG. 2 shows a bilateral link on one line with spectrum spread, for the exchange of information between two points in both directions, in a highly disturbed atmosphere (computer conversing with a peripheral).

In the case of a two-direction link on the same line (FIG. 2), an emitter 12 and a receiver 13 with spectrum spread are provided at each end of the line, identical to those described hereinabove, coupled to the transmission line by means of a Y-coupler 14.

Emission and reception may be simultaneous without mutual disturbance. In certain configurations, it is not necessary for the coupler to be directive, although this is generally preferable. In this case, the information will circulate in the emitter-towards-line direction and in the line-towards-receiver direction, but will be blocked bilaterally between emitter and receiver.

The emission of an emitter at one end of the transmission line will be received by the associated receiver at the other end, on condition that they are synchronised on the same pseudo-random frequency A. The link may be made at the same time in the other direction provided that the other emitter-receiver couple is synchronised on a same pseudo-random sequence B which is different from the first and, of course, provided that operation is carried out in base band.

Figure 3:
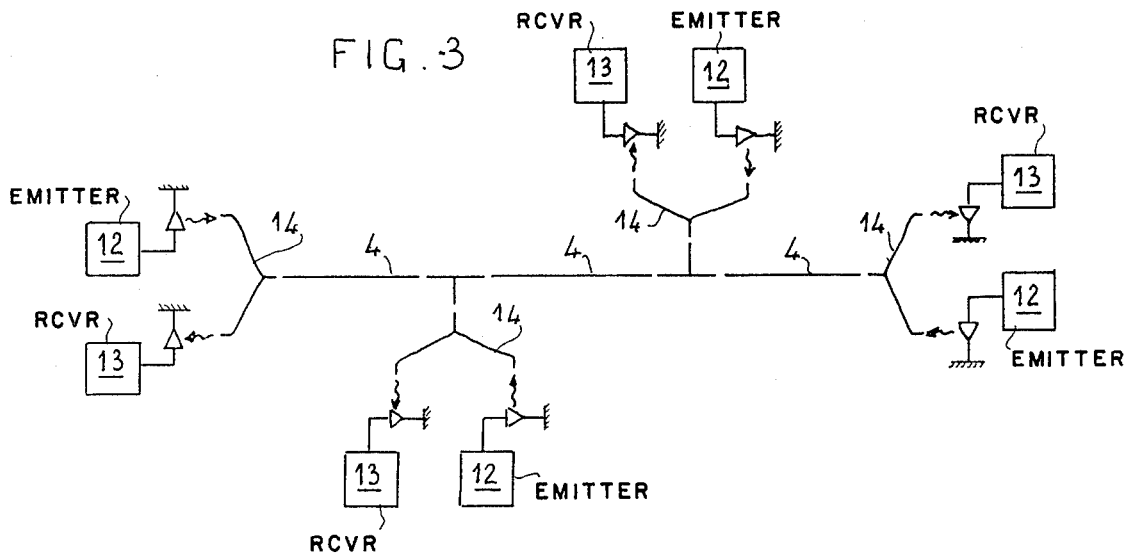
FIG. 3 shows a simultaneous multi-access link with spectrum spread for the exchange of information in both directions between a plurality of peripherals and a central processing member or between a plurality of subscribers taken in two's on the same line (computer conversing with a plurality of peripherals or telephone network)

For a simultaneous multi-access link with spectrum spread by optical fibres, such as shown in FIG. 3, each subscriber's set comprises an emitter 12, a receiver 13 and a coupler 14.

A set is identified by the unique pseudo-random sequence of its emitter.

When a receiver desires to listen to a particular emitter, it must re-create an exact and synchronised replica of the pseudo-random sequence of the emitter in question. Its correlator will extract the signal corresponding to this emitter from all the others present at that moment on the line in the ratio of the process gain PG (3000 in the example in question). To reduce the risks of parasitic correlations, particular measures will be taken:

The clocks of the pseudo-random sequence generators of each emitter will be wired on substantially different frequencies, first among themselves;

The pseudo-random sequences, identifying the subscribers, will be chosen of maximum length, compatible with an acceptable synchronisation acquisition time;

The sequences will be chosen so as to present the minimum of parasitic correlations between them.

In a lattice link with spectrum spread by optical fibres (FIG. 4) in order to increase reliability of transmission, in the event of a rupture of the optical transmission line, a latticed multiple path structure is adopted.

Each subscriber's set differs from those described hereinbefore only by the coupler, which is replaced by a multi-channel optical mixer.

If one of the paths is interrupted, the information may always transit, taking another path.

The drawback of such a structure lies, apart from its complexity, in the creation of echoes in normal functioning.

Let us assume:

that each subscriber is connected to the network by a node, such as A, B, C . . . G; each node, which is entirely passive, is constituted by an optical mixer and four terminals which may equally well act as input or output;

that the power injected by a terminal of a node, considered as input, is distributed uniformly and totally (node without loss) between the four terminals; each of the other three terminals considered as output will receive ¼ of the incident power;

that one subscriber only, X, emits a message of power Px intended for one subscriber only, Y, connected to the network by node E;

that the links between the nodes are without losses.

The message of X may reach Y:
by the path A E
by the path A B C D E
by the path A B G D E
simultaneously, hence the multiple echoes indicated hereinabove.

Figure 4:
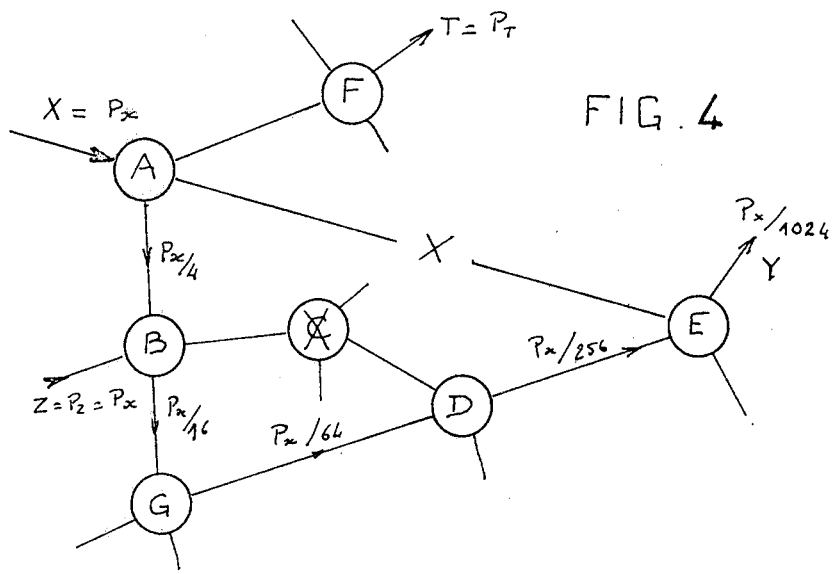
FIG. 4 shows a simultaneous multi-access link with lattice network and spectrum spread, which allows links with greater functional reliability, such as for example data transmission buses on board aircraft.

However, the advantage of such a structure is that it is reliable. In FIG. 4, it has been assumed that the direct link AE was cut and the node C destroyed. There is still a possible path, ABGDE, for conducting the message from X to Y.

It will be observed that, by this path, Y will only receive a power of −30 dB with respect to Px (instead of 6 db by the direct path AE). Such a signal level is, however, sufficient for a suitable transmission by known means.

The network will be latticed so that no subscriber will have to transit more than five consecutive nodes to reach his most remote correspondent.

Let us observe that, if another subscriber Z emits a message of power Pz=Px at the input of node B, close to node A, intended for a subscriber T connected to the network by the node F, the receiver of X will simultaneously receive:

A fraction of the signal of its own emitter, received in return, of power Px/4 (−6 dB) which it will easily recognize;

A fraction of the signal transmitted by the emitter of Z, of power Px/16 (−12 dB) which it may eliminate by correlation.

Let us assume that the receiver of X wishes to receive the reply of Y and that the power Py of the emitter of Y is equal to Px.

The receiver of X will receive, at the same time as the two signals mentioned hereinabove, a message from Y of a power equal to Px/1024 (−30 dB).

The process gain (PG) must therefore enable the useful signal to be extracted from the jammer with a power of −18 dB.

As the process gain is 35 dB, we still have a margin of 17 dB, or 5 jammers placed in conditions identical to Z.

Figure 5:
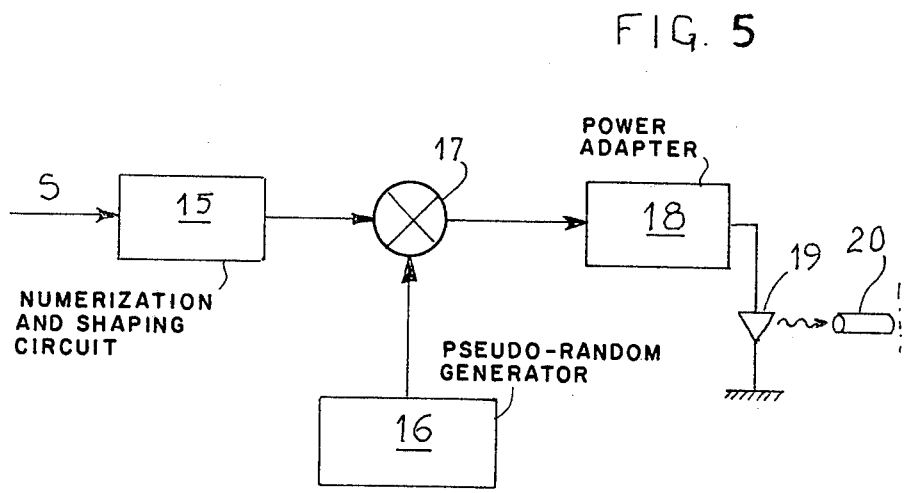
FIG. 5 is a block diagram of a spectrum spread emitter.

In a link with spectrum spread by optical fibres, the emitter (FIG. 5) comprises:

a member 15 for numerisation and shaping of the information which must leave in logic series at two levels. It should be noted that numerisation is not imperative, as the information could be transmitted in analog form in duration modulation for example, on condition that the levels are compatible with the logic.

a programmable pseudo-random code generator 16, which supplies a series of ONES and of ZEROS whose distribution is almost random as a function of the time, i.e. the number of 1's is equal, to within a unit, to the number of 0's, as well as the 11's and 00's, 111's and 000's, etc. The sequence which serves to identify once and for all an emitter particular to the construction, is chosen as a function: of the number of messengers capable of simultaneously emitting on the line, the interferences and the desired synchronisation acquisition speed. It must be as long as possible in order to be approximate to the properties of the random generators, it must present a clear correlation peak (linear sequence), and inter-correlation levels with the other frequencies which are as low as possible (orthogonal sequences). In practice, this generator may be made by means of a shift register re-looped with the aid of one or more "exclusive OR" gates or by means of a read-only memory.

a modulator 17, which makes the product of the two pieces of information constituted by the message and the pseudo-random code. At its output, the phase of the pseudo-random sequence inverts to the rhythm of the message. In practice, an "exclusive OR" gate is used.

a power adapter 18 which effects the adaptation of power necessary for supplying a light emitter 19 (which may be an electroluminescent diode or a laser), converting the electrical pulses into light pulses introduced into the optical fibre 20. In the case of using a laser, it may be necessary to narrow the pulses in order to respect the work rate of the component. A feedback may prove useful to maintain the power emitted constant despite the ageing of the light emitter. In practice, a videofrequency amplifier is made, whose pass band extends about five times beyond the frequency of the pseudo-random generator. At the output, it must be able to supply a sufficient current to supply the light generator, i.e. between 100 and 300 mA.

Figure 6:
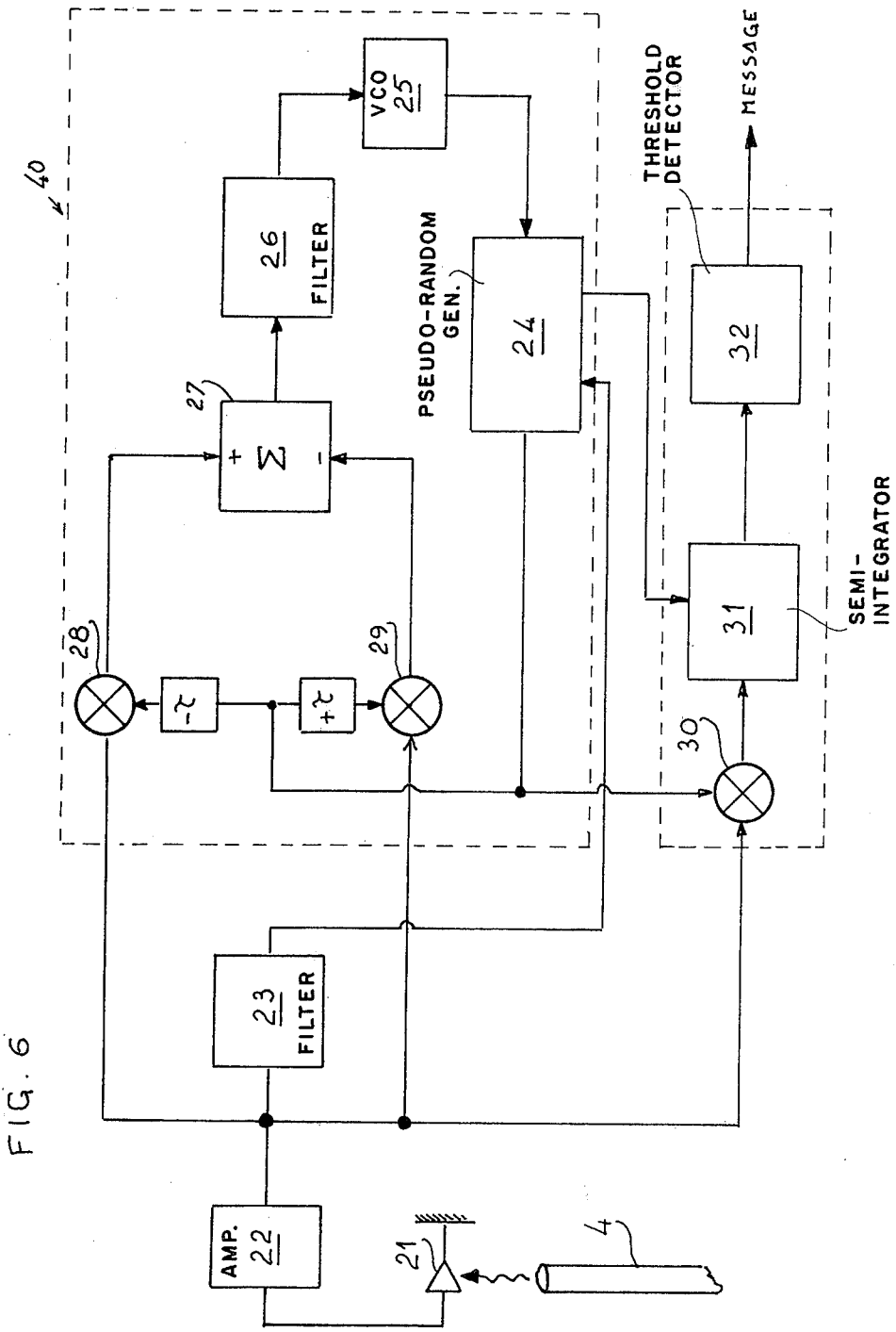
FIG. 6 is the diagram of a receiver.

The receiver (FIG. 6) comprises:

means 21 for transducing light into electrical current, followed by a wide band amplifier 22 and provided with an automatic gain control. At the output of the amplifier 22, the signals are peak-clipped;

a synchronisation acquisition device comprising a passive matched filter 23:

a servo control loop 40 adapted to synchronise the clock of the pseudo-random generator, and which comprises: a sequence generator 24, a VCO clock 25, or "Voltage Controlled oscillator", i.e. an oscillator whose frequency is controlled by a voltage, a low pass filter 26, adapted to filter the control signal of the VCO clock, an adder 27, which effects the difference between the signals issuing from two correlators 28 and 29 with the reference controls of which two delay devices $+\tau$ and $-\tau$ are inserted in series.

The transducer 21 must be of a model adapted for optical transmissions, particularly concerning signal-to-noise ratio and pass band. A cascade photodiode or a PIN photodiode will therefore be chosen.

The amplifier 22, with high input impedance ($Zi > 10$ M$\Omega$), must be able to amplify a sufficient frequency band extending from less than twice the lowest frequency to more than five times the highest frequency to be transmitted. It comprises an automatic gain control loop associated with a peak-clipping circuit, so as to standardise the amplitude of the signals at a level compatible with the logic used in the following stages. This level must remain constant in the whole range of variation of the input signals.

The passive matched filler 23 is a correlator which does not necessitate a clock for functioning thereof. It may be made from delay line elements LC or a surface acoustic wave device. A common factor of these two solutions is that they comprise their own reference with respect to which they effect the correlation inscribed by wiring in their structure. When the message which advances comes into coincidence with the reference profile, the passive matched filter delivers a pulse indicating this coincidence. This pulse serves to initialise the pseudo-random sequence delivered by the sequence generator.

By the servo control loop of the clock frequency, the wave form of the signal of the message is compared, simultaneously by two correlators, with two identical pseudo-random sequences shifted in time by the two delay devices $+\tau$ and $-\tau$ with respect to the sequence of the generator. When the pseudo-random sequence and the message are strictly synchronised, the two correlators 28 and 29 deliver identical voltages and their difference effected by the adder is zero.

If the sequence desynchronises in advance or in lag with respect to the message, the two correlators deliver different voltages, hence the appearance of a bipolar voltage at the output of the adder 27.

This voltage is filtered by the loop filter then applied to the control of the VCO clock. The phase of the signals is such that the frequency of the VCO clock catches up with the frequency of the message as soon as a variation is observed.

The clock (VCO) serves to control the pseudo-random sequence generator. The generator produces in time a series of ONES and ZEROS whose distribution is strictly identical to that of the sequence generator at emission.

Once the synchronisation is effected, the product is made between the pseudo-random sequence of the local generator and that of the message with the aid of a multiplier 30. A semi-integrator 31 (integrator on the duration of a bit, returned to zero at the end of bit)

followed by a threshold detector 32, restores the message at the output.

The device forming the subject of the present invention may be applied to telephonic transmissions, as well as to all domains concerning the transmission of information by means of optical fibres.

What is claimed is:

1. A system for transmitting information in the form of electrical signals from an emitter to a receiver by an optical fiber transmission medium, said system being characterized in that said emitter comprises:

shaper means for shaping said electrical signals; code generator for generating a pseudo-random code; modulator means connected to said shaper means and said generator for deriving a product of said shaped electrical signals and said pseudo-random code so that the spectrum of the information contained in the electrical signals to be transmitted is spread over all the pass-band availabe at the emitter side of said transmission medium; a power adapter connected to receive said product from said modulator means; and transducer means connected to said power adapter for transducing output signals from said power adapter into light pulses to be introduced into optical fiber transmission medium; and said receiver comprises:

transducer means receiving said light pulses from said optical fiber transmission medium for transducing said light pulses into received electrical signals; an amplifier with automatic gain control connected to said transducer means of said receiver for amplifying said received electrical signals; a synchronization acquisition passive filter connected to receive amplified signals from said amplifier; a further pseudo-random code generator connected to receive filtered signals from said passive filter; a voltage controlled oscillator connected to provide a clock signal to said further generator for controlling the latter; servo-control means connected between said amplifier and said oscillator for synchronizing said voltage controlled oscillator; a multiplier connected to said further generator and to said amplifier for deriving a further product of output signals of said further generator and said amplifier; a semi-integrator connected to receive said further product from said multiplier; and a threshold detector connected to said semi-integrator for restoring the electrical signals transmitted by the emitter.

* * * * *